Jan. 14, 1964 T. W. GLYNN 3,117,886
COLORED GLASS ARTICLE
Filed Nov. 15, 1960

INVENTOR.
THEODORE W. GLYNN
BY
Brown, Critchlow, Flick & Peckham
his ATTORNEYS.

3,117,886
COLORED GLASS ARTICLE
Theodore W. Glynn, Kingsport, Tenn., assignor to American-Saint Gobain Corporation, a corporation of Delaware
Filed Nov. 15, 1960, Ser. No. 69,401
3 Claims. (Cl. 117—45)

This invention relates to colored glass panels such, for example, as panels that are used in construction applications.

Heretofore, glass sheets have been made for building panels, room dividers, store fronts, and the like with the uncoated glass surface exposed, and have been provided with colors to make them more desirable for their intended purpose. For example, glass sheets have been produced that have been colored by applying a coloring material to the glass and then sandwiching that color to the glass by the application of a highly reflective coating material such as aluminum. Tinted transparent enamels have been applied to glass sheets and aluminum or other metal sprayed over the transparent enamel to reflect the colors of the transparent enamel. Those products are not entirely satisfactory for several reasons. Defects in the glass due to cords or irregularities in the surface of patterned or smooth glass are accentuated and become more prominent with the foregoing practices. Atmospheric corrosion and water contribute to produce a color change or spotting in such products as a consequence of chemical attack at the interface of, for example, a transparent enamel and an aluminum coating. Such attack can be avoided, or at least minimized, by sealing the edges and the backing member with an epoxy or silicone coating to exclude air and moisture. It is evident that such practices materially increase costs and, therefore, are undesirable. Opaque ceramic enamels used to provide coloring for glass panels are characterized by the major disadvantage that they tend to be dull and lifeless and cannot be made to give a bright metallic appearance.

Figure 1:
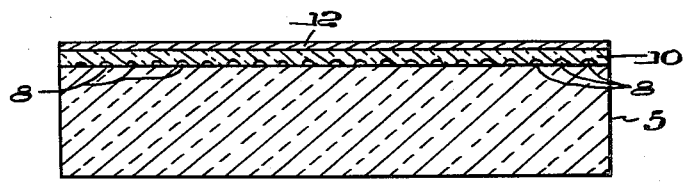
Figure 2:
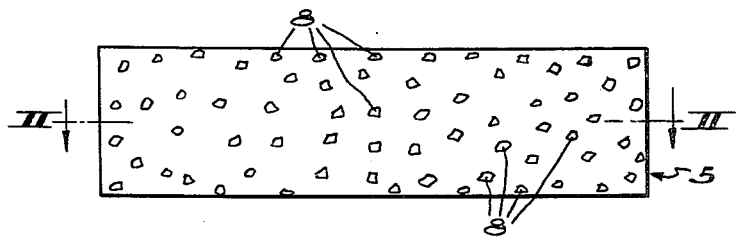

In the attached drawing, FIG. 1 shows a front view of a glass panel of the invention and FIG. 2 is a section of the panel of FIG. 1 along line II—II.

It has now been discovered, and it is on this discovery that the invention is in large part predicated, that bright, lustrous colored glass panels can be produced using opaque enamels and that this desirable result can be accomplished in a fashion that avoids the problems characteristic of the prior panels noted hereinbefore. In accordance with my discovery, a colored panel is provided that consists essentially of a flat glass sheet to which a multitude of small specks or dots of highly reflective metal, such as aluminum or other metal that adheres to glass satisfactorily, have been applied. The reflective metal specks are covered with a colored opaque enamel and, if desired, a backing material, such as a covering of aluminum, is attached to complete the structure. In this manner, I have been able to produce products in which the color is uniform, in which the product is free from chemical attack from water and the atmosphere since the normal place of attack is sealed, and in which the normal cords and patterns streaks of smooth and patterned glass sheet are in no manner emphasized to detract from the appearance of the product.

Typical highly reflective metals that can be used include aluminum, tin, zinc, copper and bronze. Aluminum is the preferred metal, and the invention will be described hereinafter as it relates to aluminum. However, it should be understood that the other metals also could be used as well.

The aluminum deposit that is produced directly on the glass sheet is in an amount such that 15 to 40 percent of the surface is covered. Hence, 60 to 85 percent of the glass remains to be covered by the opaque ceramic enamel to provide background color. In this fashion, the dots of aluminum serve as points of light reflection and thus contribute the brightness and lustrousness that is characteristic of my products. The aluminum dots can be produced on the glass by a plurality of processes. Preferably, however, molten aluminum is atomized and sprayed on the glass heated to an elevated temperature; the molten aluminum and the glass join upon cooling. The metal can be easily applied by conventional use of a metallizing gun such as a Schoop or a Plazma flame gun, by splattering the glass with metal.

Once the atomized aluminum, or other reflective metal, has been applied to the glass, the resulting metallized sheet is coated with a standard opaque ceramic enamel that contains a pigment to provide the color desired in the resulting article. A typical enamel is composed of a clear glass frit, which usually is a high lead borosilicate glass, that is ground in a ball mill together with a coloring agent; the usual coloring agents include metal oxides such, for example, as titanium dioxide for a white color and manganese dioxide for a black color. The enamel is opaque upon the inclusion of a large amount of the coloring agent. The enamel can be applied by any of the standard methods such as spray coating, silk screen or roller coating and usually is at least 0.0005 inch thick. For example, it can be suspended in a liquid such as benzene, turpentine, or a water-alcohol mixture, and sprayed on the cold glass. This enamel is opaque and, accordingly, the uniformity of application is not critical from an operability standpoint, contrary to experience with respect to transparent coatings. To avoid blistering the enamel, its solvent is evaporated before firing. At normal conditions, the solvent would evaporate in five minutes. This can be speeded by blowing with hot air. With the enamel in place, the sheet is then retempered firing the enamel in place and effectively sealing each speck of aluminum on the glass. At termination of this step, the enameled sheet is heated to a temperature sufficient to joint the covering coating, for example, aluminum, and such covering is applied in the usual manner. For example, the aluminum can be applied by spraying atomized aluminum on the enamel, while the enameled sheet is at a temperature of 235° C. to 450° C.

As an example of the present invention, and with reference to the drawings, a tempered sheet 5 of glass, while still at a temperature of at least 350° C. from the tempering operation, is sprayed with atomized aluminum 8 until 15 to 40 percent of the surface is thereby speckeled. The aluminum is applied while the glass sheet is at a temperature in the range of 350° to 520° C., preferably at about 450° C. The resulting sheet is permitted to stand at room temperature until cool. Thereafter, the metallized sheet is sprayed with the colored enamel 10 to a thickness at least sufficient to completely cover each speck of aluminum. After the enamel solvent is evaporated, the enameled sheet is heated to a temperature of at least 650° C. to fire the enamel to the glass and effectively seal the specks of aluminum as well as to have the glass hot enough to retemper it. Firing occurs in about four minutes with the usual size glass sheets. When the temperature of the article returns to the range of 350° to 520° C. atomized aluminum 12 is sprayed on the enamel until the enamel is completely coated, and usually to a thickness of about 0.0015 inch. The sheet is then permitted to cool to room temperature. If desired, the aluminum coating can be burnished.

In the products thus obtained, each reflective particle of aluminum in contact with the glass is surrounded by and embedded in the ceramic enamel. Accordingly, it is protected from chemical attack from water and the atmosphere. The high portion of the glass surface that is covered with enamel serves, it is believed, to avoid accentuation of the glass pattern streaks. The simplicity of the manner of production is another advantage of my invention.

It will be apparent that changes can be made in my invention without departing from its scope. For example, the backing member can be omitted where the heat reflectance and abrasion resistance thus provided are not needed or desired. It should also be appreciated that the enamels, coloring agents, and glass compositions that are to be used are those already well known in the glass arts.

According to the provisions of the patent statutes, I have explained the principle of my invention and have described what I now consider to represent its best embodiment. However, I desire to have it understood that, within the scope of the appended claims, the invention may be practiced otherwise than as specifically described.

I claim:

1. As a new article of manufacture, a colored metallic luster article comprising a tempered flat glass sheet having fused to one surface a non-continuous coating of specks of a reflective metal in an amount sufficient to cover about 15 to 40 percent of that surface, and an opaque colored enamel fused to that surface of said glass and enclosing said specks of reflective metal.

2. An article in accordance with claim 1, in which said reflective metal is a member selected from the group consisting of aluminum, tin zinc, copper and bronze.

3. As a new article of manufacture, a colored metallic luster article comprising a tempered flat glass sheet having fused to one surface a non-continuous coating of specks of aluminum in an amount sufficient to cover about 15 to 40 percent of that surface, an opaque colored enamel fused to that surface of said glass and enclosing said specks of aluminum and a continuous coating of aluminum over said fused enamel.

References Cited in the file of this patent

UNITED STATES PATENTS

| | | |
|---|---|---|
| 1,698,307 | La Hodny | Jan. 8, 1929 |
| 1,970,759 | Mattman | Aug. 21, 1934 |
| 2,004,567 | Brumbaugh | June 11, 1935 |
| 2,119,608 | Stewart | June 7, 1938 |
| 2,236,911 | Long | Apr. 1, 1941 |
| 2,247,058 | Irby | June 24, 1941 |
| 2,536,399 | Stewart | Jan. 2, 1951 |

FOREIGN PATENTS

| | | |
|---|---|---|
| 839,677 | Great Britain | June 29, 1960 |